Oct. 20, 1931.  W. T. BARKER, JR  1,828,217
METHOD OF AND APPARATUS FOR FEEDING MOLTEN GLASS
Filed Dec. 12, 1928
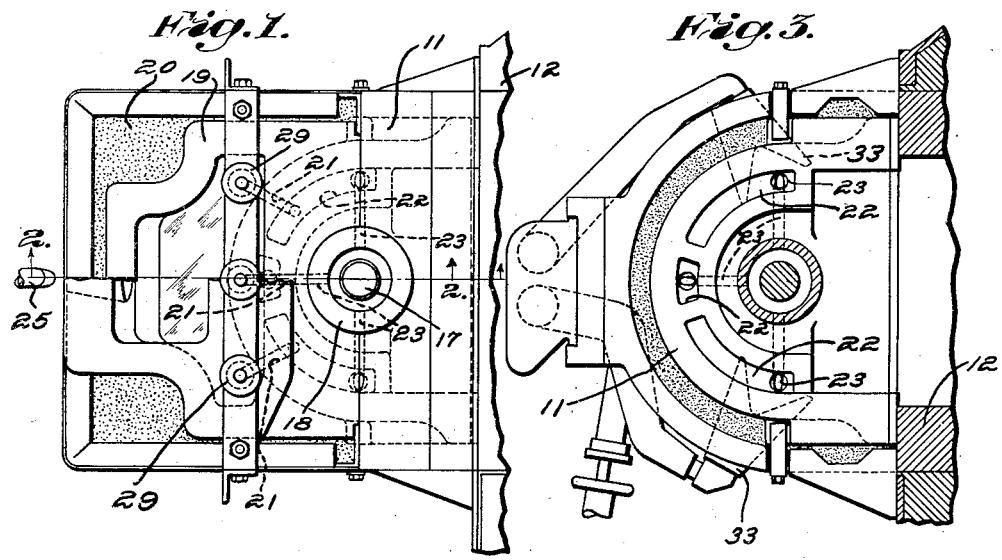
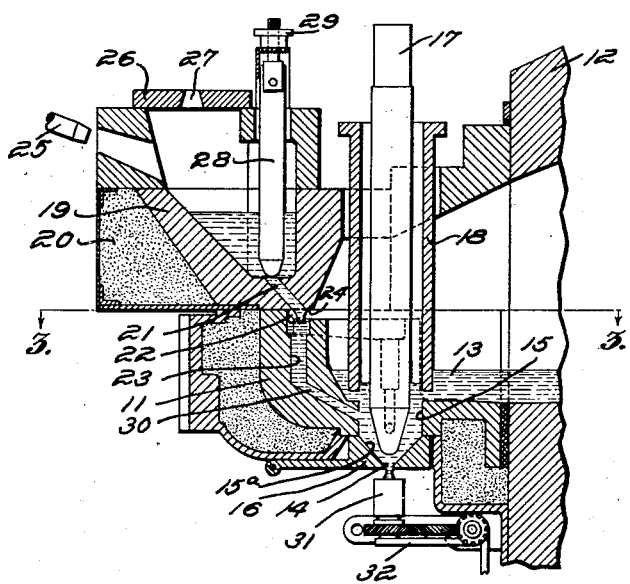

Patented Oct. 20, 1931

1,828,217

UNITED STATES PATENT OFFICE

WILLIAM T. BARKER, JR., OF HARTFORD, CONNECTICUT, ASSIGNOR TO HARTFORD-EMPIRE COMPANY, OF HARTFORD, CONNECTICUT, A CORPORATION OF DELAWARE

METHOD OF AND APPARATUS FOR FEEDING MOLTEN GLASS

Application filed December 12, 1928. Serial No. 325,550.

My invention relates generally to apparatus for and methods of feeding molten glass in predetermined quotas or charges and more particularly to the feeding of variegated glass having streaks, bands, or striations therein and thus adapted for use in the manufacture of toy marbles or other articles of variegated glassware.

An object of the invention is to provide improved methods and apparatus for combining a stream or streams of glass of a secondary color or colors with glass of a primary or base color and for controlling the mixing of the glasses of the different colors and the discharge thereof from an outlet, to the end that the temperature, viscosity and general condition of the differently colored components of the discharged glass will be substantially uniform and the discharged glass at the same time will have clearly defined and distinct streaks or striations of a secondary color or colors close to or at the surface thereof.

A more specific object of the invention is to provide an efficient glass feeding apparatus which will afford facilities for introducing glass of a secondary color into a stream of glass of a primary or base color below the surface of the latter and at or adjacent to a discharge outlet for the combined glasses.

Other objects and advantages of the invention will be apparent from the following description, when considered in conjunction with the accompanying drawings.

The invention contemplates the provision of a supply of glass of a predetermined primary or base color in a glass container having a discharge outlet in its bottom. The glass container may be provided with suitable means for regulating the temperature, viscosity and condition of the glass therein. The outlet in the bottom of the glass container, which may be the forehearth of a melting furnace, may be formed at the lower end of a well into which one or more streams of glass of a secondary color or colors may be introduced. The temperature, viscosity and condition of the glass of the secondary color or colors are suitably related to the temperature, viscosity and condition of the glass of the base color to permit discharge from the outlet of substantially homogeneous glass which, however, will have clearly defined streaks or striations of the secondary color or colors at or close to the surface thereof.

The invention also contemplates twisting the issued glass, if desired, to wind the streaks of glass of the secondary color within and around the body of the accumulating charge. When the charge has been accumulated in suspension below the discharge outlet and the desired color effects have been obtained, such charge may be severed from the oncoming glass for delivery to a marble or other glassware forming machine.

The discharge of glass through the outlet may be regulated by the action of an implement that is reciprocated in adhesive contact with the glass in the container in substantial alignment with and adjacent to the discharge outlet. Suitable means also may be provided for regulating the rate of flow of glass of the primary color into the discharge well and for regulably controlling the rate of flow of each stream of glass of a secondary color into the glass in the discharge well.

In the drawings:

Fig. 1 is a fragmentary plan view of glass feeding apparatus embodying certain structural features of the invention, certain parts being omitted, Fig. 2 is a vertical section substantially along the line 2—2 of Fig. 1, looking in the direction of the arrows, and Fig. 3 is a plan sectional view substantially along the line 3—3 of Fig. 2 and showing also mechanism for severing charges from the discharged glass.

Referring now to the drawings, the numeral 11 designates a glass container which is shown as being a forehearth appurtenant to a glass melting tank 12, only a fragmentary portion of which is shown. The glass container 11 preferably conforms substantially in construction with the glass feeding forehearth of the well-known Hartford-Empire single feeder, a disclosure of which may be found in British Patent No. 227,078, accepted Aug. 27, 1925, and which therefore need not be specifically described herein. Molten glass of a predetermined primary or base color flows in a stream, as at 13, Fig. 2, from the melting tank 12 into the forehearth 11 so that a discharge outlet 14 at the lower end of a well 15 in the bottom of the forehearth is submerged continuously by glass from said stream and a sufficient head of glass is maintained in the forehearth to tend to cause a gravity flow at a desirable rate through the outlet 14. The lower portion of the well 15 may comprise a removably and replaceably mounted outlet ring 16 having a downwardly tapering bore as indicated at 15a.

A refractory implement 17 may be reciprocated vertically with its lower end depending into the well 15 in adhesive contact with the glass in the container to regulate discharge of glass through the outlet 14 and to aid in suspending the issued glass in successive masses below the outlet and in shaping such masses while they are accumulating in suspension. The implement 17 may on its down stroke accelerate discharge of glass through the outlet and on its up stroke retard, stop or reverse gravity flow of glass through the outlet. The operating mechanism for the implement 17 preferably is as included in the aforesaid Hartford-Empire single feeder and therefore has not been illustrated in the drawings. Such operating mechanism is capable of adjustment to permit the implement to remain stationary, with its lower end adjustably positioned with respect to the discharge outlet so as to permit a regulated gravity flow through the outlet.

Preferably, the flow of glass from the stream 13 into the well 15 is regulated by a vertically adjustable refractory tube 18 which surrounds the implement 17 and is disposed in axial alignment with the discharge outlet. The tube 18 and its operating and adjusting mechanism preferably are substantially the same as mechanism that is included in the aforesaid Hartford-Empire single feeder and such tube may be adjusted so as to be disposed entirely above the level of the glass in the forehearth, to dip into the glass in the forehearth so as to permit a regulated flow of glass into the well, or to seat on the curb at the upper end of the well and thus prevent flow of glass into the well. The latter adjustment may be used to permit removal and replacement of the outlet ring or for other work at or adjacent to the outlet. A gate (not shown) also preferably will be provided to regulate the depth of glass in the forehearth, as is the case in the aforesaid Hartford-Empire single feeder.

An auxiliary container 19, made of suitable refractory material and suitably insulated, as at 20, is mounted on the primary container or forehearth 11. The secondary glass container 19 has outlet openings 21 formed through the bottom thereof and each arranged to discharge into a basin or enlarged upper end portion 22 of a passage 23 that is formed in the adjacent wall of the primary container 11. Each of the passages 23 opens at its lower end laterally into the well 15 below the normal level of glass within the container 11. The outlet openings 21 in the bottom of the secondary container and the associated passages 23 may vary in number and the relative spacing thereof about the axis of the well 15 also may vary according to particular requirements. In the construction shown in the drawings, the secondary container 19 is provided with three of the outlet openings 21 and of course with a like number of the passages 23, the lower ends of which are spaced approximately 90° apart around the well 15. The basins or enlarged upper end portions 22 of the passages 23 preferably are in open communication at their inner sides with the interior of the primary container 11, as shown at 24 in Fig. 2, so that the glass issuing from the outlet openings 21 will be subjected to heat from the interior of the forehearth 11 in the same manner as the glass within the forehearth 11.

The glass within the secondary container may be reheated and its temperature regulated in any suitable manner, as by heat from the burner 25. The secondary container 19 may have a removable cover 26 to permit access to the interior of such secondary container and this removable cover may have a combination vent and observation opening as indicated at 27.

The glass within the secondary container may have any desired color, usually different from that of the glass in the primary container. The glass in the primary container of course has any desirable color that is to be the base color of the marbles or other articles which are to be formed. Such glass usually is transparent glass tinted with red, blue or brown, in which event the glass within the secondary container may be white and more opaque than the primary glass.

The discharge of glass from the secondary container through the outlet openings 21 may be regulated by vertically reciprocating regulating implements 28, each of which on its down stroke may reduce the effective size of the upper end of the associated outlet opening 21 and restrict flow therethrough and on its up stroke enlarge the effective size of the upper end of the associated outlet opening 21 so as to permit a relatively greater flow therethrough. The mechanism for reciprocating the respective regulating implements 28 is not shown in the accompanying drawings but it is intended that operating mechanism therefor may be provided as disclosed in my prior application for patent for "Method of and apparatus for feeding molten glass," Serial No. 302,730, filed August 29, 1928. Such operating mechanism is adapted to reciprocate the respective regulators 28 with non-coincident cycles so that the volumes of flow through the respective outlet openings 21 will be different at all times. The relative times of occurrence of like points in the cycles of operation of the respective regulators may be adjusted. It, of course, is intended that the regulators 28 shall be capable of vertical adjustment, as by means of the hand wheels 29, independently of the action of the above described operating mechanism, so that the regulators may remain stationary with their lower ends adjusted with respect to the upper ends of the associated outlet openings 21 to permit regulated gravity flow of glass through the outlet openings or to prevent flow through such openings.

The operation of the structure which has been described so far will be substantially as follows:

Glass of the secondary color may be placed within the secondary container 29 in any suitable known manner, as through the opening at the top when the cover 26 has been removed. The temperature and condition of the glass in the secondary container are regulated so that such glass when introduced into the glass from the primary container will mix with the latter as desired.

It is obvious that vertical partitions, not shown, may be placed in the secondary container between the respective outlet openings 21 so that glasses of different secondary colors may be discharged through the respective outlet openings 21.

The glass from the secondary container passes by gravity through the outlet openings 21 into the basins or enlarged upper end portions 22 of the passages 23 and thence in streams of relatively slight cross section, as at 30, Fig. 2, laterally into the glass in the well 15. The combined streams then will be discharged through the outlet 14 under the control of the reciprocating or stationary implement 17 and on issuance below the outlet 14 will accumulate in suspension from the outlet. It is within the purview of the present invention that a cup 31, such as is disclosed in my aforesaid prior application, Serial No. 302,730, shall be brought periodically to position to engage the lower end of the glass for each charge that is accumulating in suspension below the discharge outlet 14. The cup 31 is provided with suitable operating and supporting mechanism, partially shown at 32, in Fig. 2, and fully shown and described in my aforesaid prior application, Serial No. 302,730, whereby the cup will be rotated at a relatively slow varying speed while it is in engagement with the glass so as to twist the accumulating glass and thereby to cause the streaks of glass of the secondary color to be twisted around the body of the charge and to appear therein as irregular but clearly defined and distinct striations of a different color in glass of the base color.

When the desired twisting effect has been obtained, the cup is removed from engagement with the suspended glass charge, which then will be severed by the periodic action of the shear blades 33, shown in Fig. 3. The shear blades and their supporting and operating mechanism may be as fully disclosed in my prior application, Serial No. 302,730.

Glass feeding apparatus according to the present invention is well adapted for use in producing glass charges of substantially symmetrical viscosity and condition throughout but having a base color formed with streaks or striations of a different color or colors therein so that toy marbles formed of such charges will closely resemble marbles made of agate, onyx, or other natural rock.

The invention may be carried as to the combination, arrangement and character of the elements of the structural embodiment thereof illustrated in the accompanying drawings and as to the arrangement and combination of steps of methods carrying out the invention without departing from the spirit and scope of the invention, which is not to be limited except by a fair interpretation of the terms of the appended claims.

I claim as my invention:

1. Glass feeding apparatus comprising means for flowing molten glass of a given color from the source of supply to a discharge outlet submerged by said glass, means for introducing glass at said outlet of a different color into said first named glass below the level of the latter, and means for successively forming the glass into suspended masses and for twisting each of said masses to distribute the glass of different colors therein.

2. Glass feeding apparatus comprising a stationary container for molten glass having a well provided with a submerged discharge outlet at the lower end thereof, and a passage opening into the side wall of said well below the level of the glass in said well for conducting a stream of glass of a color different from that of the first named glass into the glass in said well.

3. Glass feeding apparatus comprising a stationary container for molten glass having a submerged discharge outlet in its base and adapted to receive glass of a base color from a source of supply, a stationary container for glass of a secondary color, and a passageway formed in the wall of said first-named container for conducting a stream of glass from said second named container directly into the glass of the first named container above said outlet and below the surface level of the glass in said first named container.

4. Glass feeding apparatus comprising a container for molten glass of a base color, said container having a discharge outlet in its base and having a passage in a wall thereof opening into the interior of said container adjacent said outlet below the surface level of the glass therein, and a second container having glass of a secondary color therein and having a submerged outlet opening arranged to discharge into said passage in the wall of said first named container.

5. Glass feeding apparatus comprising a container for molten glass of a base color, said container having a submerged discharge outlet in its base, means for regulating discharge of glass through said outlet, said container having a passage formed in a wall thereof to open at its lower end into the container above said outlet and below the surface level of the glass in container, said passage having its upper end portion in communication of the interior of the container above the surface level of the glass therein, and a container for glass of a secondary color having a submerged discharge outlet in its bottom opening into the upper portion of the passage in the wall of said first named container.

6. Glass feeding apparatus comprising a container for molten glass of a base color, said container having a submerged discharge outlet in its base, means for regulating discharge of glass through said outlet, said container having a passage formed in a wall thereof arranged to open at its lower end into the container above said outlet and below the surface level of the glass in container, said passage having its upper end portion in communication of the interior of the container above the surface level of the glass therein, a container for glass of a secondary color having a submerged discharge outlet in its bottom opening into the upper portion of the passage in the wall of said first named container, and means for locally heating the glass within said second named container.

7. Glass feeding apparatus comprising a glass feeding forehearth having a discharge outlet in its base submerged by the glass therein, said forehearth having a passage formed in a wall thereof to open at its lower end below the surface level of the glass in said forehearth adjacent to said outlet and having its upper end portion enlarged above the surface level of the glass to provide a basin opening into said forehearth, and an auxiliary glass container mounted on said forehearth and having a discharge outlet in its bottom arranged to discharge a stream of glass into said basin.

8. A glass feeding apparatus comprising a container for glass of a base color, said container having a well at its bottom terminating at a lower end in a discharge outlet, said container having a plurality of passages formed in a wall thereof to open laterally into said well at spaced points around the latter below the surface level of the glass in said container, each of said passages having an upper end portion enlarged to form a basin having communication with the interior of said container above the surface level of the glass therein, an auxiliary container mounted on said first named container for holding glass of a secondary color, said auxiliary container having a plurality of spaced discharge openings in the bottom thereof, each arranged to discharge into a separate basin within the first named container, and independent means for regulably controlling discharge through the respective outlet openings of said auxiliary container.

9. The method of feeding variegated molten glass which comprises passing molten glass of a base color in a stream through a discharge outlet submerged by the glass, introducing into said glass a stream of glass of a secondary color at a point below the surface level of the glass and adjacent to said discharge outlet, forming the glass issuing from said outlet into successive masses, and twisting each of said masses to distribute the glass of different colors therein in circular streaks or striations through the mass.

10. The method of feeding variegated molten glass which comprises establishing flow of a stream of glass of a base color downwardly through an outlet submerged by glass from said stream, and introducing laterally into said glass a plurality of streams of glass of a different color at points spaced around the axial line of the discharge outlet and below the surface level of the glass of said first named stream.

11. The method of feeding variegated molten glass which comprises passing glass of a base color downwardly through a discharge outlet constantly submerged by said glass and introducing streams of glass of varying size and of a color different from that of said base color into the glass of the base color below the surface level of the latter and adjacent to said discharge outlet, and twisting the glass depending from said outlet to wind in the base color the streams of glass that were added thereto.

12. Glass feeding apparatus comprising a container for molten glass of a base color, said container having a well in its base formed with a discharge outlet at its lower end submerged by the glass, a second container for molten glass adjacent to the said first named container and adapted to hold glass of a secondary color, means arranged to conduct glass from said second container laterally into the well of the first named container below the surface level of the glass in the latter, means for forming the glass issuing from the discharge outlet into successive suspended masses, and means for twisting each of said suspended masses partially to enclose the glass of base color with irregular circular bands or striations of secondary color.

13. The method of feeding variegated molten glass which comprises establishing flow of glass of a given color downwardly through a well having a submerged discharge outlet at its lower end, introducing laterally through the side of the well into said downwardly moving glass a stream of glass of a different color, forming the glass issuing from said outlet into successive suspended masses, and twisting each of said masses partially to enclose the glass of given color with irregular circular streaks or striations of different color.

Signed at Hartford, Connecticut, this 10th day of December, 1928.

WILLIAM T. BARKER, Jr.